United States Patent
Ha et al.

(10) Patent No.: US 12,498,763 B2
(45) Date of Patent: Dec. 16, 2025

(54) DISPLAY DEVICE

(71) Applicant: Samsung Display Co., LTD., Yongin-si (KR)

(72) Inventors: Seung Hwa Ha, Yongin-si (KR); Sang Wol Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 356 days.

(21) Appl. No.: 18/344,559

(22) Filed: Jun. 29, 2023

(65) Prior Publication Data

US 2024/0134419 A1 Apr. 25, 2024
US 2024/0231438 A9 Jul. 11, 2024

(30) Foreign Application Priority Data

Oct. 21, 2022 (KR) .................. 10-2022-0136862

(51) Int. Cl.
*G06F 1/16* (2006.01)
*H04M 1/02* (2006.01)

(52) U.S. Cl.
CPC .......... *G06F 1/1656* (2013.01); *G06F 1/1616* (2013.01); *G06F 1/1681* (2013.01); *H04M 1/0216* (2013.01)

(58) Field of Classification Search
CPC .. H04M 1/0216; G06F 1/1616; G06F 1/1656; G06F 1/1681
See application file for complete search history.

(56) References Cited

U.S. PATENT DOCUMENTS

| | | | |
|---|---|---|---|
| 11,076,495 B2 | 7/2021 | Cromer et al. | |
| 2019/0045646 A1* | 2/2019 | Brand | H05K 5/0226 |
| 2022/0217228 A1* | 7/2022 | Hu | G06F 1/1652 |
| 2023/0236098 A1* | 7/2023 | Lee | G01N 3/20 |

FOREIGN PATENT DOCUMENTS

| | | |
|---|---|---|
| CN | 113257123 A | 8/2021 |
| KR | 10-2014-0014669 A | 2/2014 |
| KR | 10-2019-0124844 A | 11/2019 |
| KR | 10-2022-0001038 A | 1/2022 |

* cited by examiner

*Primary Examiner* — Anthony Q Edwards
(74) *Attorney, Agent, or Firm* — Womble Bond Dickinson (US) LLP

(57) ABSTRACT

A display device includes a display panel to be folded, a panel support supporting a bottom surface of the display panel, and a jig under the panel support, and including a first flat plate frame, a second flat plate frame on one side of the first flat plate frame, and a wing plate fixed to the second flat plate frame to rotate with respect to a rotation axis, wherein a folding axis is on a boundary between the first flat plate frame and the wing plate, and wherein the panel support includes a first flat plate portion overlapping the first flat plate frame, a second flat plate portion overlapping the second flat plate frame, and a grid pattern portion on the wing plate, between the first and second flat plate portions, and extending to the boundary between the first flat plate frame and the wing plate.

20 Claims, 12 Drawing Sheets

DISPLAY DEVICE

CROSS-REFERENCE TO RELATED APPLICATION

This application claims priority to, and the benefit of, Korean Patent Application No. 10-2022-0136862 filed on Oct. 21, 2022, in the Korean Intellectual Property Office, the contents of which in its entirety are herein incorporated by reference.

BACKGROUND

1. Field

The present disclosure relates to a display device.

2. Description of the Related Art

The importance of a display device is increasing with the development of multimedia. In response to the importance of the display device, various types of display devices, such as an organic light-emitting display device and a liquid crystal display device are used.

Recently, with the development of display technology, research and development of display devices having flexible displays have been actively conducted. The flexible display may extend or reduce a display screen, for example, fold, bend, or slide the display screen, thereby significantly contributing to a decrease in volume or a change in design of the display device.

SUMMARY

Aspects of the present disclosure provide a display device in which a formation of a visible line due to a plastic change occurring as a panel is bent is alleviated.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to an aspect of the present disclosure, a display device includes a display panel configured to be folded with respect to a folding axis extending in a first direction, a panel support supporting a bottom surface of the display panel, and a jig under the panel support, and including a first flat plate frame, a second flat plate frame on one side of the first flat plate frame, and a wing plate fixed to the second flat plate frame, and configured to rotate with respect to a rotation axis extending in the first direction, wherein the folding axis is on a boundary between the first flat plate frame and the wing plate, and wherein the panel support includes a first flat plate portion overlapping the first flat plate frame, a second flat plate portion overlapping the second flat plate frame, and grid pattern portion on the wing plate, between the first flat plate portion and the second flat plate portion, and extending to the boundary between the first flat plate frame and the wing plate.

The wing plate and the grid pattern portion may be spaced apart from each other.

The grid pattern portion may define a first slit penetrating through the panel support.

The grid pattern portion may include a first grid pattern portion defining the first slit, and a second grid pattern portion defining a second slit partially recessed into the panel support, the second grid pattern portion being closer to the rotation axis than the first grid pattern portion.

The jig may include a hinge portion connecting the first flat plate frame and the second flat plate frame to enable folding of the first flat plate frame and the second flat plate frame with respect to the folding axis.

The first flat plate portion may include an adhesive portion adhered to the first flat plate frame through an adhesive member, and a free portion that is not adhered to the first flat plate frame.

When the first flat plate frame and the second flat plate frame are folded by the hinge portion, the free portion of the first flat plate portion may be bent.

When the first flat plate frame and the second flat plate frame are folded by the hinge portion, the adhesive portion of the first flat plate portion may have a flat profile.

The display panel may include a bending area overlapping the grid pattern portion and the free portion of the first flat plate portion, wherein a first visible line and a second visible line, which extend in the first direction in a state in which the jig is unfolded, are formed in the bending area, wherein the first visible line is on the boundary between the first flat plate frame and the wing plate, and wherein the second visible line is on the wing plate.

The display device may further include a first set cover accommodating the first flat plate frame, and a second set cover accommodating the second flat plate frame, wherein a thickness of the first set cover is less than a thickness of the second set cover.

According to an aspect of the present disclosure, a display device includes a display panel folded with respect to a folding axis extending in a first direction, a panel support supporting a bottom surface of the display panel, and a jig under the panel support, and including a first flat plate frame, a second flat plate frame on one side of the first flat plate frame, and a wing plate fixed to the second flat plate frame, and configured to rotate with respect to a rotation axis extending in the first direction, wherein the folding axis is on a boundary between the first flat plate frame and the wing plate, and wherein the panel support includes a first flat plate portion overlapping the first flat plate frame, a second flat plate portion overlapping the second flat plate frame, and a grid pattern portion between the first flat plate portion and the second flat plate portion, the grid pattern portion being on the wing plate, and extending to a portion of the first flat plate frame beyond the boundary between the first flat plate frame and the wing plate.

The wing plate and the grid pattern portion may be spaced apart from each other.

The grid pattern portion may define a first slit penetrating through the panel support.

The jig may include a hinge portion connecting the first flat plate frame and the second flat plate frame to each other with a hinge to enable the first flat plate frame and the second flat plate frame to fold with respect to the folding axis.

The first flat plate portion may include an adhesive portion adhered to the first flat plate frame through an adhesive member, and a free portion that is not adhered to the first flat plate frame.

When the first flat plate frame and the second flat plate frame are folded by the hinge portion, the grid pattern portion may be bent at a portion overlapping the rotation axis, and a portion overlapping the folding axis.

The display panel may include a bending area overlapping the grid pattern portion and the free portion of the first flat plate portion, wherein a first visible line, a second visible line, and a third visible line extending in the first direction in a state in which the jig is unfolded are formed in the bending area, wherein the first visible line is on the boundary between the first flat plate frame and the wing plate, wherein the second visible line is on the wing plate, and wherein the third visible line is on the first flat plate frame.

According to an aspect of the present disclosure, a display device includes a display panel configured to fold with respect to a folding axis extending in a first direction, a jig under the display panel to guide a folding behavior of the display panel, and a set member accommodating the jig, wherein the jig includes a first flat plate frame, a second flat plate frame on one side of the first flat plate frame, a hinge portion connecting the first flat plate frame and the second flat plate frame with a hinge to enable the first flat plate frame and the second flat plate frame to fold with respect to the folding axis, and a wing plate fixed to the second flat plate frame, and configured to rotate with respect to a rotation axis extending in the first direction, wherein the folding axis is on a boundary between the first flat plate frame and the wing plate, wherein the set member includes a first set cover accommodating the first flat plate frame, and a second set cover accommodating the second flat plate frame and the wing plate, and wherein a thickness of the first set cover is less than a thickness of the second set cover.

The display panel may include a first display area overlapping the first flat plate frame, a second display area overlapping the second flat plate frame, a bending display area between the first display area and the second display area, and a first visible line extending in the first direction on the boundary between the first flat plate frame and the wing plate, and a second visible line extending in the first direction adjacent to the second display area, in the bending display area.

The display device may further include a touch input button on the second display area.

In the display device according to one or more embodiments, the formation of the visible line due to the plastic change occurring as the panel is bent may be alleviated.

However, the aspects of the embodiments are not restricted to the one set forth herein. The above and other aspects of the embodiments will become more apparent to one of daily skill in the art to which the embodiments pertain by referencing the claims.

BRIEF DESCRIPTION OF THE DRAWINGS

The above and other aspects of the present disclosure will become more apparent by describing in detail embodiments thereof with reference to the attached drawings, in which.

DETAILED DESCRIPTION

Figure 1:
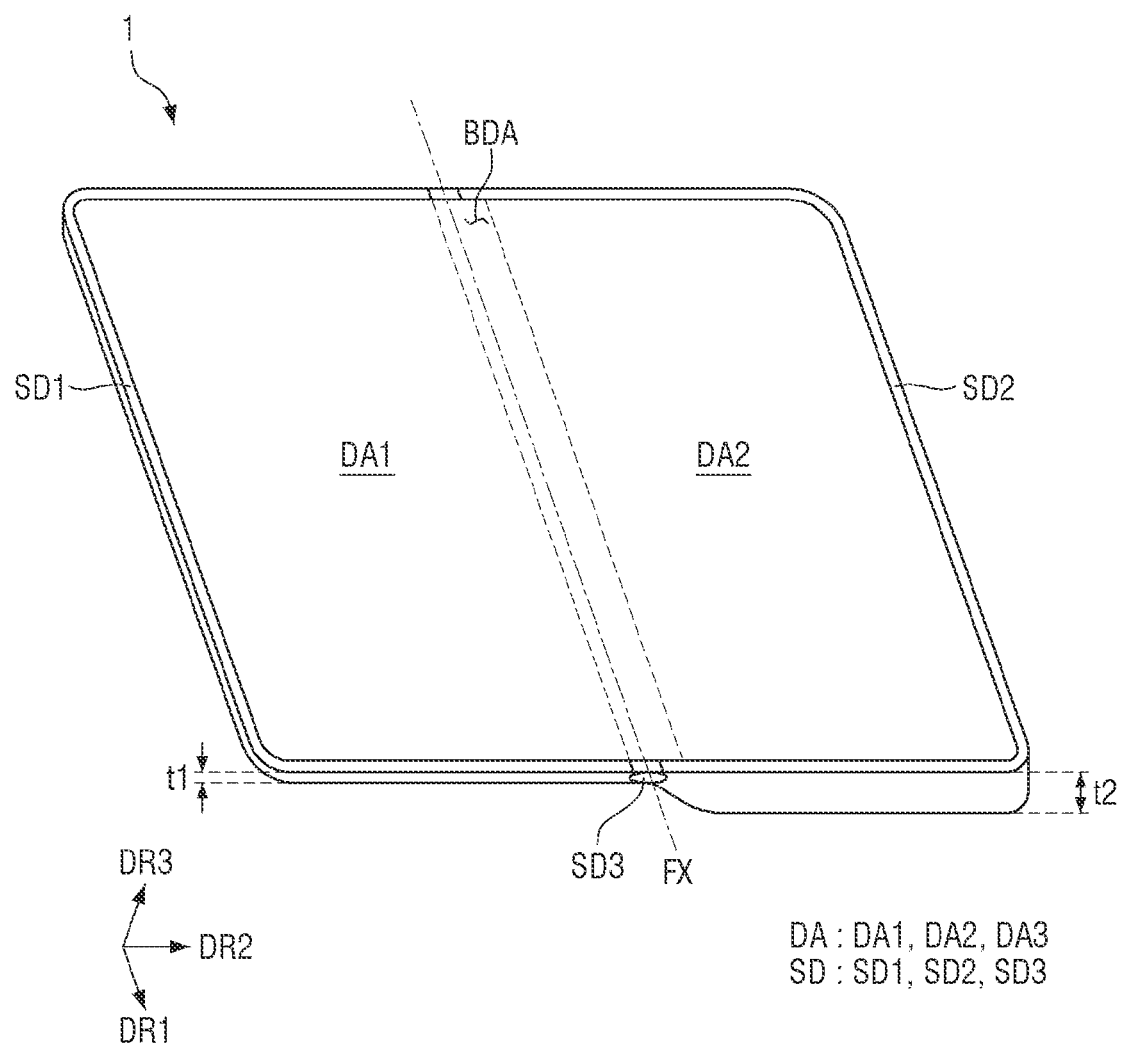
FIG. 1 is a perspective view illustrating a display device according to one or more embodiments.

Aspects of some embodiments of the present disclosure and methods of accomplishing the same may be understood more readily by reference to the detailed description of embodiments and the accompanying drawings. Hereinafter, embodiments will be described in more detail with reference to the accompanying drawings. The described embodiments, however, may have various modifications and may be embodied in different forms, and should not be construed as being limited to only the illustrated embodiments herein. Further, each of the features of the various embodiments of the present disclosure may be combined or combined with each other, in part or in whole, and technically various interlocking and driving are possible. Each embodiment may be implemented independently of each other or may be implemented together in an association. The described embodiments are provided as examples so that this disclosure will be thorough and complete, and will fully convey the aspects of the present disclosure to those skilled in the art, and it should be understood that the present disclosure covers all the modifications, equivalents, and replacements within the idea and technical scope of the present disclosure. Accordingly, processes, elements, and techniques that are not necessary to those having ordinary skill in the art for a complete understanding of the aspects of the present disclosure may not be described.

Unless otherwise noted, like reference numerals, characters, or combinations thereof denote like elements throughout the attached drawings and the written description, and thus, descriptions thereof will not be repeated. Further, parts that are not related to, or that are irrelevant to, the description of the embodiments might not be shown to make the description clear.

In the drawings, the relative sizes of elements, layers, and regions may be exaggerated for clarity. Additionally, the use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the illustrated shapes of regions, but are to include deviations in shapes that result from, for instance, manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place.

Thus, the regions illustrated in the drawings are schematic in nature and their shapes are not intended to illustrate the actual shape of a region of a device and are not intended to be limiting. Additionally, as those skilled in the art would realize, the described embodiments may be modified in various ways, all without departing from the spirit or scope of the present disclosure.

In the detailed description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form to avoid unnecessarily obscuring various embodiments.

Spatially relative terms, such as "beneath," "below," "lower," "lower side," "under," "above," "upper," "upper side," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below," "beneath," "or under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. Similarly, when a first part is described as being arranged "on" a second part, this indicates that the first part is arranged at an upper side or a lower side of the second part without the limitation to the upper side thereof on the basis of the gravity direction.

Further, the phrase "in a plan view" means when an object portion is viewed from above, and the phrase "in a schematic cross-sectional view" means when a schematic cross-section taken by vertically cutting an object portion is viewed from the side. The terms "overlap" or "overlapped" mean that a first object may be above or below or to a side of a second object, and vice versa. Additionally, the term "overlap" may include layer, stack, face or facing, extending over, covering, or partly covering or any other suitable term as would be appreciated and understood by those of ordinary skill in the art. The expression "not overlap" may include meaning, such as "apart from" or "set aside from" or "offset from" and any other suitable equivalents as would be appreciated and understood by those of ordinary skill in the art. The terms "face" and "facing" may mean that a first object may directly or indirectly oppose a second object. In a case in which a third object intervenes between a first and second object, the first and second objects may be understood as being indirectly opposed to one another, although still facing each other.

It will be understood that when an element, layer, region, or component is referred to as being "formed on," "on," "connected to," or "(operatively or communicatively) coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. In addition, this may collectively mean a direct or indirect coupling or connection and an integral or non-integral coupling or connection. For example, when a layer, region, or component is referred to as being "electrically connected" or "electrically coupled" to another layer, region, or component, it can be directly electrically connected or coupled to the other layer, region, and/or component or intervening layers, regions, or components may be present. However, "directly connected/directly coupled," or "directly on," refers to one component directly connecting or coupling another component, or being on another component, without an intermediate component. In addition, in the present specification, when a portion of a layer, a film, an area, a plate, or the like is formed on another portion, a forming direction is not limited to an upper direction but includes forming the portion on a side surface or in a lower direction. On the contrary, when a portion of a layer, a film, an area, a plate, or the like is formed "under" another portion, this includes not only a case where the portion is "directly beneath" another portion but also a case where there is further another portion between the portion and another portion. Meanwhile, other expressions describing relationships between components, such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

For the purposes of this disclosure, expressions, such as "at least one of," or "any one of," when preceding a list of elements, modify the entire list of elements and do not modify the individual elements of the list. For example, "at least one of X, Y, and Z," "at least one of X, Y, or Z," "at least one selected from the group consisting of X, Y, and Z," and "at least one selected from the group consisting of X, Y, or Z" may be construed as X only, Y only, Z only, any combination of two or more of X, Y, and Z, such as, for instance, XYZ, XYY, YZ, and ZZ, or any variation thereof. Similarly, the expression, such as "at least one of A and B" and "at least one of A or B" may include A, B, or A and B. As used herein, "or" generally means "and/or," and the term "and/or" includes any and all combinations of one or more of the associated listed items. For example, the expression, such as "A and/or B" may include A, B, or A and B. Similarly, expressions, such as "at least one of," "a plurality of," "one of," and other prepositional phrases, when preceding a list of elements, modify the entire list of elements and do not modify the individual elements of the list.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

The description of an element as a "first" element may not require or imply the presence of a second element or other elements. The terms "first," "second," etc. may also be used herein to differentiate different categories or sets of elements. For conciseness, the terms "first," "second," etc. may represent "first-category (or first-set)," "second-category (or second-set)," etc., respectively.

In the examples, the x-axis, the y-axis, and/or the z-axis are not limited to three axes of a rectangular coordinate system, and may be interpreted in a broader sense. For example, the x-axis, the y-axis, and the z-axis may be perpendicular to one another, or may represent different directions that are not perpendicular to one another. The same applies for first, second, and/or third directions.

The terminology used herein is for the purpose of describing particular embodiments only and is not intended to be limiting of the present disclosure. As used herein, the singular forms "a" and "an" are intended to include the plural forms as well, while the plural forms are also intended to include the singular forms, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 2:
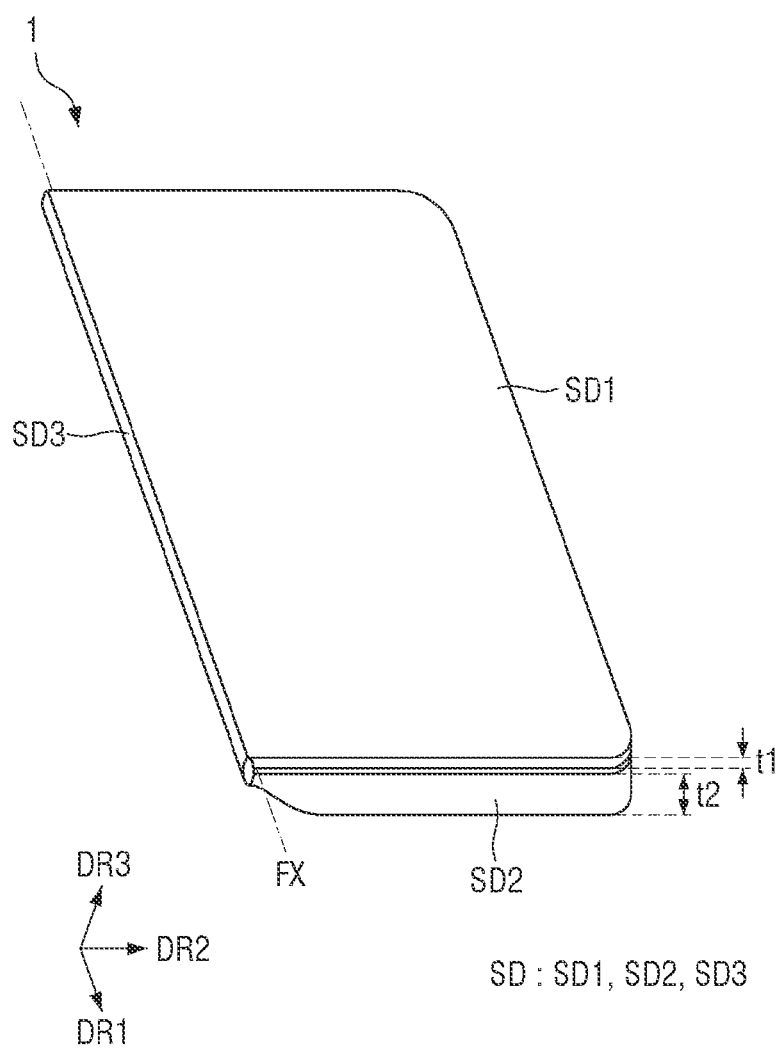
FIG. 2 is a perspective view illustrating a folded state of the display device according to one or more embodiments.

Referring to FIGS. 1 to 2, a display device 1 according to one or more embodiments is a device that displays a moving image or a still image, and may be used as a display screen of various products, such as televisions, laptops, monitors, billboards, and Internet of Things, as well as portable electronic devices, such as mobile phones, smart phones, tablet PCs, smart watches, watch phones, mobile communication terminals, electronic organizers, e-books, PMPs, navigation, and UMPC.

FIG. 1 is a perspective view illustrating a display device according to one or more embodiments. FIG. 2 is a perspective view illustrating a folded state of the display device according to one or more embodiments.

In FIG. 1, a first direction DR1, a second direction DR2, and a third direction DR3 are defined. The first direction DR1 and the second direction DR2 may be substantially perpendicular to each other, the first direction DR1 and the third direction DR3 may be substantially perpendicular to each other, and the second direction DR2 and the third direction DR3 may be substantially perpendicular to each other. It may be understood that the first direction DR1 means a vertical direction in the drawings (e.g., in plan view), the second direction DR2 means a horizontal direction in the drawings (e.g., in plan view), and the third direction DR3 means upper and lower directions in the drawings (e.g., in a cross-sectional view), that is, a thickness direction.

In the following specification, unless otherwise specified, the term "direction" may refer to both directions toward both sides extending along the direction. In addition, when both "directions" extending to both sides need to be distinguished from each other, one side will be referred to as "one side in the direction" and the other side will be referred to as "the other side in the direction". In FIG. 1, a direction in which an arrow indicating a direction is directed is referred to as one side, and an opposite direction thereof is referred to as the other side. However, it should be understood that the directions mentioned in the embodiments refer to relative directions, and the embodiments are not limited to the mentioned directions.

In addition, for convenience of explanation, in referring to surfaces of the display device 1 or each member constituting the display device 1, one surface facing one side in a direction in which an image is displayed, that is, in the third direction DR3 is referred to as a top surface, and an opposite surface of the one surface is referred to as a bottom surface. However, the present disclosure is not limited thereto, and the one surface and the other surface of the member may be referred to as a front surface and a bottom surface, respectively, or may also be referred to as a first surface or a second surface. In addition, in describing a relative position of each member of the display device 1, one side in the third direction DR3 may be referred to as an upper side, and the other side in the third direction DR3 may be referred to as a lower side.

A planar shape of the display device 1 may have a rectangular shape in which a vertical side is longer than a horizontal side, as illustrated in FIG. 1, and each of the corners of the display device 1 may have a right-angled planar shape or a rounded planar shape, but is not limited thereto. For example, the planar shape of the display device 1 may have a rectangular shape in which the vertical side is shorter than the horizontal side. FIG. 1 illustrates that the display device 1 has the rectangular shape in which the vertical side is longer than the horizontal side.

The display device 1 includes a display area DA in which pixels are located to display a screen. The display area DA may include a first display area DA1, a bending display area BDA, and a second display area DA2.

The first display area DA1 and the second display area DA2 may be portions that are not bent. The first display area DA1 is a portion of the display device 1, and may be located on the other side in the second direction DR2. The second display area DA2 is a portion of the display device 1, and may be located on one side in the second direction DR2.

The bending display area BDA may be located between the first display area DA1 and the second display area DA2. That is, the second display area DA2 may be located on one side of the bending display area BDA in the second direction DR2, and the first display area DA1 may be located on the other side of the bending display area BDA in the second direction DR2.

The bending display area BDA may be a bendable area. For example, the bending display area BDA may be bent with respect to a folding axis FX located on the bending display area BDA and extending in the first direction DR1. When the bending display area BDA is not bent, the display device 1 may maintain an unfolded state (hereinafter, referred to as a first state) as illustrated in FIG. 1, and when the bending display area BDA is bent, the display device 1 may maintain a folded state (hereinafter, referred to as a second state) as illustrated in FIG. 2.

The display device 1 may be folded in an in-folding manner in which the first display area DA1 and the second display area DA2 are folded to face each other in the second state as illustrated in FIG. 2, but is not limited thereto. For example, the display device 1 may also be folded in an out-folding manner so that the first display area DA1 and the second display area DA2 are opposite to each other. FIG. 2 illustrates that the display device 1 is folded in the in-folding manner.

The display device 1 may include a non-display area. The non-display area may be an area that does not include a screen. For example, the non-display area may be defined by a set member SD of the display device 1. In some embodiments, the non-display area may surround the display area DA, but is not limited thereto. For example, the non-display area may partially surround the display area DA.

The set member SD may form an outer shape of the display device 1. The set member SD may include a first set member SD1 covering the first display area DA1, a second set member SD2 covering the second display area DA2, and a third set member SD3 covering the bending display area BDA.

The first set member SD1 may surround an edge of the first display area DA1 in the first state of the display device 1. For example, the first set member SD1 may cover the other side of the first display area DA1 in the second direction DR2 and a portion of both sides thereof in the first direction DR1 in the first state of the display device 1. In some embodiments, the first set member SD1 may additionally cover a portion of both sides of the bending display area BDA with respect to the first direction DR1, but is not limited thereto.

The first set member SD1 may reduce or prevent visibility of the display area DA in the second state of the display device 1. For example, in the first state of the display device 1, a bottom surface of the first set member SD1 is a non-display area as a whole, and may be a portion that does not display a screen. However, the first set member SD1 is not limited thereto, and may also partially form an area that displays a screen in the second state of the display device 1.

The second set member SD2 may surround an edge of the second display area DA2 in the first state of the display device 2. For example, the second set member SD2 may cover one side of the second display area DA2 in the second direction DR2, and a portion of both sides thereof with respect to the first direction DR1, in the first state of the display device 1. In some embodiments, the second set member SD2 may additionally cover a portion of both sides of the bending display area BDA in the first direction DR1, but is not limited thereto.

The second set member SD2 may reduce or prevent visibility of the display area DA in the second state of the display device 1. For example, in the first state of the display device 1, a bottom surface of the second set member SD2 is a non-display area as a whole, and may be a portion that does not display a screen. However, the second set member SD2 is not limited thereto, and may also partially form an area that displays a screen in the second state of the display device 1.

The third set member SD3 may cover a portion of both sides of the bending display area BDA of the display device 1 with respect to the first direction DR1. The third set member SD3 may reduce or prevent visibility of a hinge portion GP (e.g., see FIG. 4), which will be described later. The third set member SD3 may couple the first set member SD1 and the second set member SD2 by a hinge to fold the first set member SD1 and the second set member SD2.

Meanwhile, the first set member SD1 and the second set member SD2 have different respective thicknesses. For example, the first set member SD1 may have a first thickness t1, and the second set member SD2 may have a second thickness t2 that is greater than the first thickness t1. This may be due to an arrangement of a wing plate 150 of a jig 100 (e.g., see FIG. 4) as a component of the display device 1, as will be described later. A detailed description thereof will be provided below.

Hereinafter, components included in the display device 1 will be described.

Figure 3:
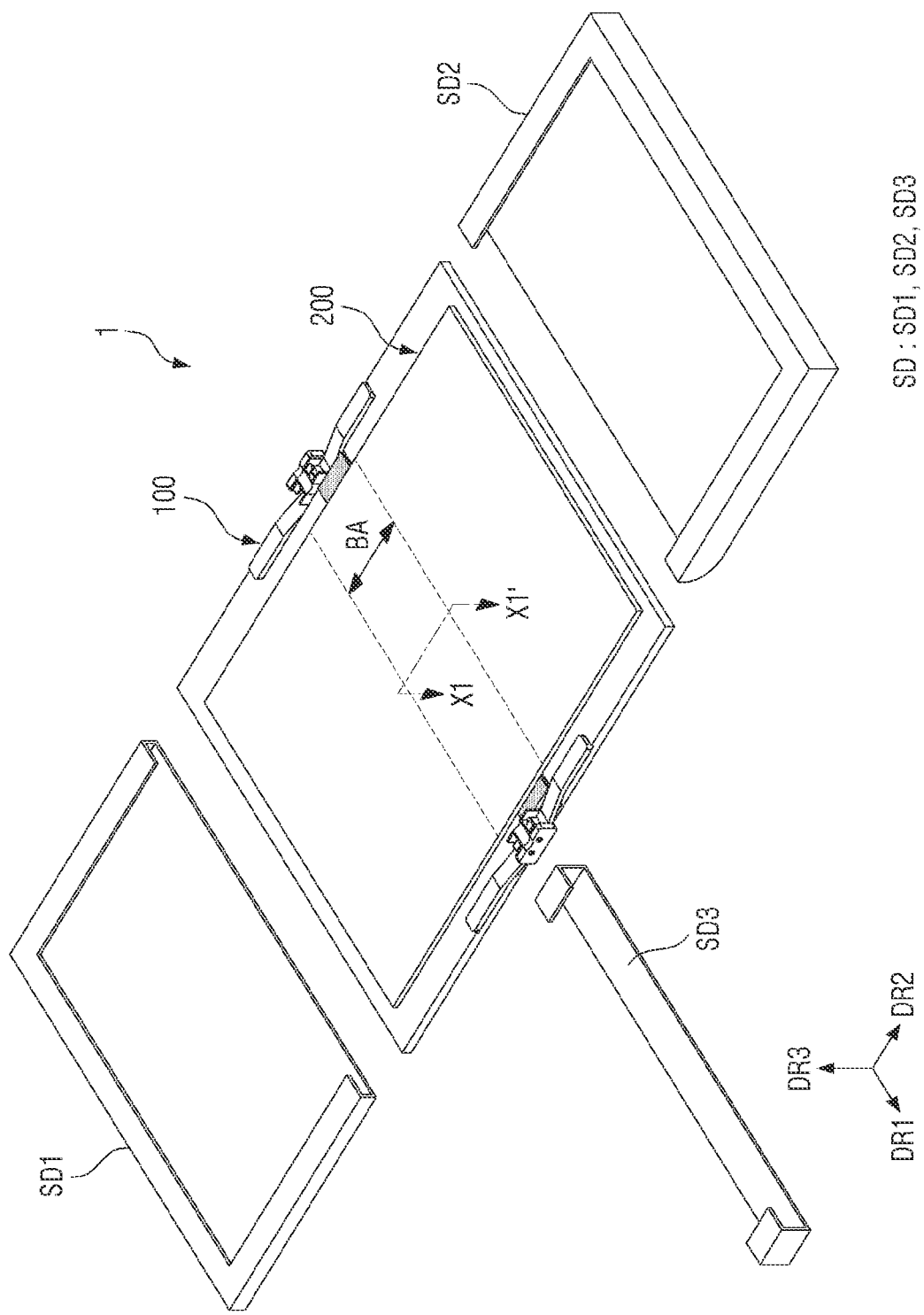
FIG. 3 is an exploded perspective view of the display device according to one or more embodiments.
Figure 4:
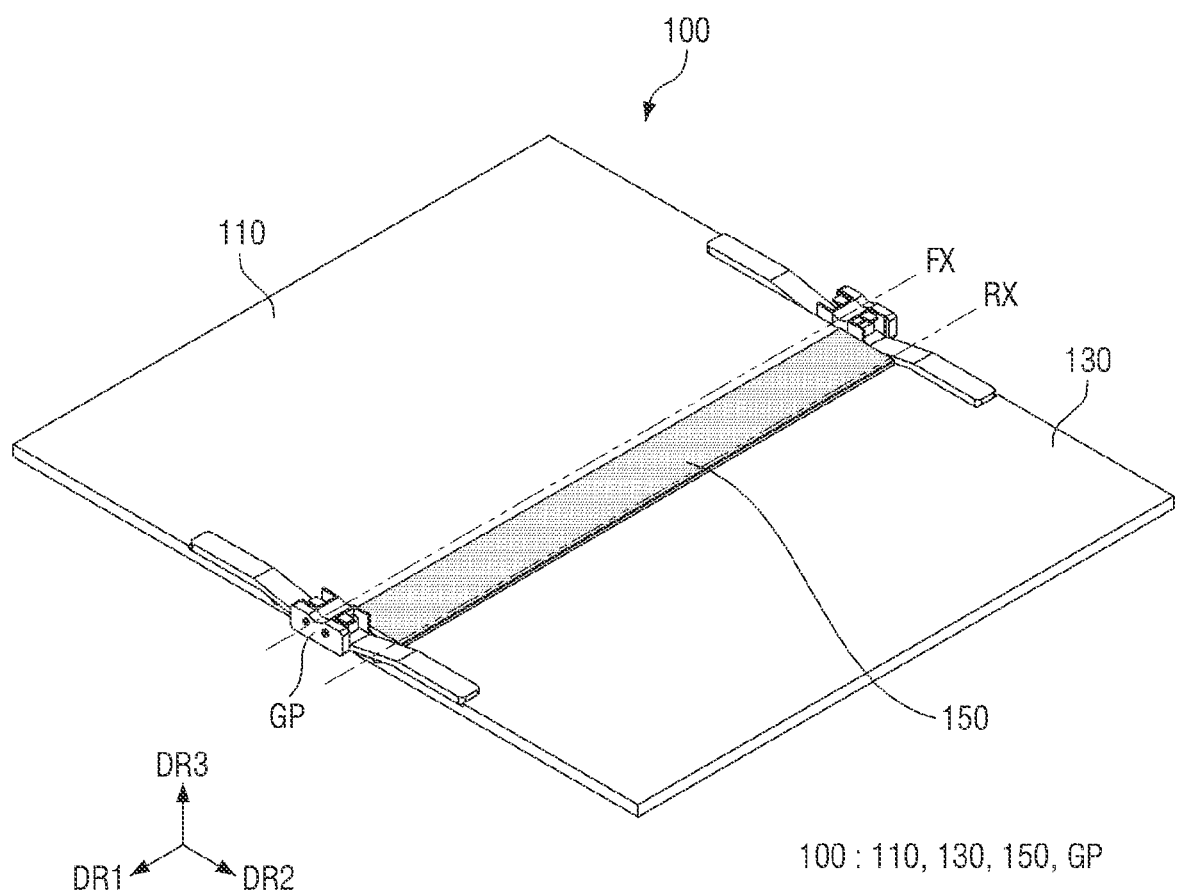
FIG. 4 is a perspective view of a jig of the display device according to one or more embodiments.
Figure 5:
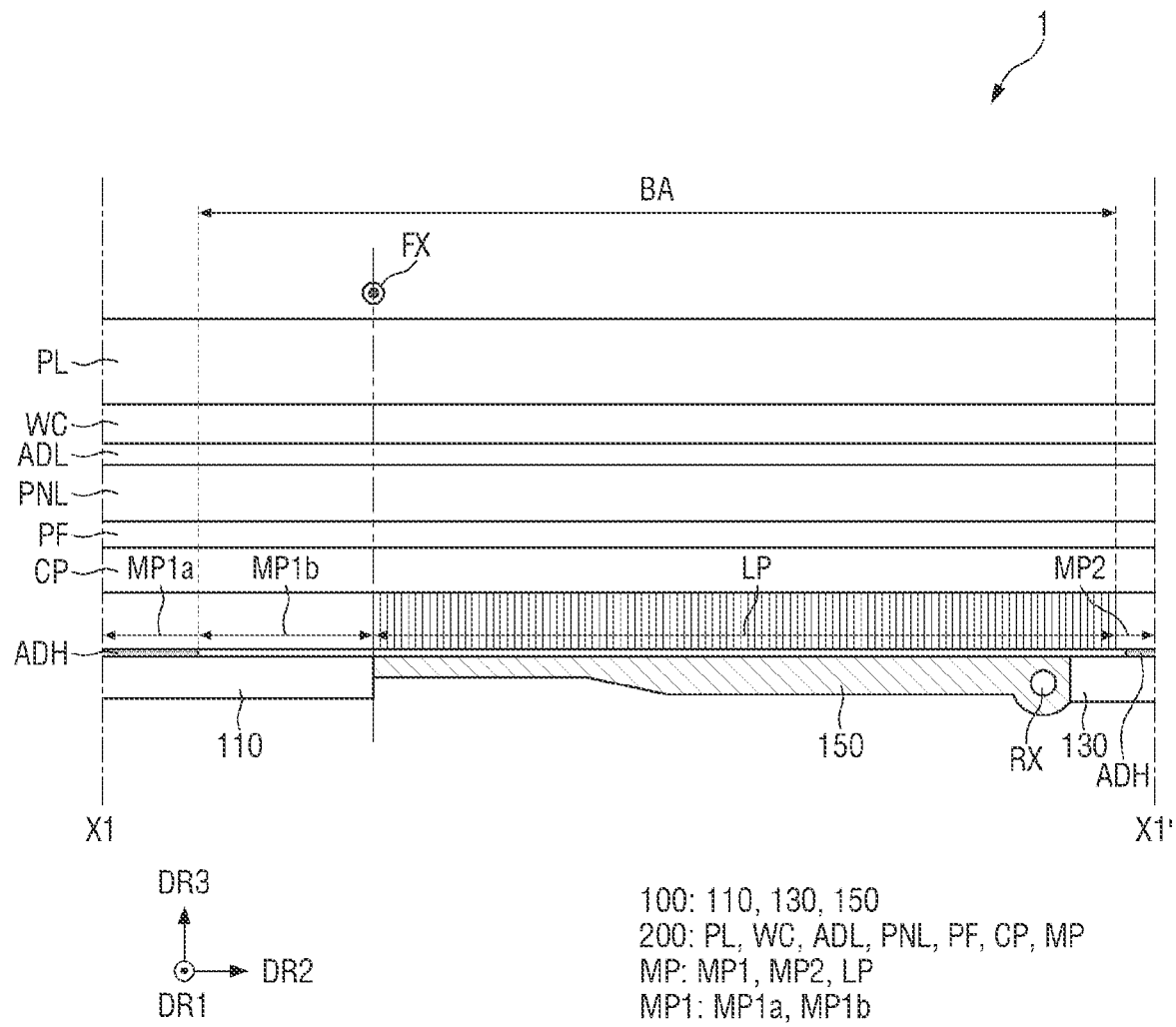
FIG. 5 is a cross-sectional view schematically illustrating a cross section taken along the line X1-X1' of FIG. 4.

FIG. 3 is an exploded perspective view of the display device according to one or more embodiments. FIG. 4 is a perspective view of a jig of the display device according to one or more embodiments. FIG. 5 is a cross-sectional view schematically illustrating a cross section taken along the line X1-X1' of FIG. 4.

Referring to FIGS. 3 to 5, the display device 1 according to one or more embodiments includes a jig 100, a display member 200, and a set member SD.

The jig 100 may serve to guide a folding behavior of the display device 1 according to one or more embodiments and support the display member 200. As illustrated in FIG. 4, the jig 100 may include a first flat plate frame 110, a second flat plate frame 130, a wing plate 150, and a hinge portion GP.

The first flat plate frame 110 of the jig 100, which is a portion that is not bent, may overlap the first display area DA1 of the display device 1. The first flat plate frame 110 may be located on the other side in the second direction DR2 as a portion of the jig 100. The first flat plate frame 110 may have a flat plate shape parallel to a plane defined in the first direction DR1 and the second direction DR2.

The second flat plate frame 130 of the jig 100, which is a portion that is not bent, may overlap the second display area DA2 of the display device 1. The second flat plate frame 130 may be located on the one side in the second direction DR2 as a portion of the jig 100. The second flat plate frame 130 may have a flat plate shape parallel to a plane defined in the first direction DR1 and the second direction DR2.

The hinge portion GP of the jig 100 may couple the first flat plate frame 110 and the second flat plate frame 130 by a hinge to fold the first flat plate frame 110 and the second flat plate frame 130. For example, the hinge portion GP includes a gear arm that is fixed with a pin and rotates, and the gear arm of the hinge portion GP is connected to each of the first flat plate frame 110 and the second flat plate frame 130. The first flat plate frame 110 and the second flat plate frame 130 rotate, respectively, as the gear arm rotates, so that the first flat plate frame 110 and the second flat plate frame 130 may be folded.

The wing plate 150 of the jig 100 may serve to relieve bending stress of the display member 200 when the display device 1 according to one or more embodiments is in the second state. The wing plate 150 may be located between the first flat plate frame 110 and the second flat plate frame 130, and may be connected to the other side of the second flat plate frame 130 in the second direction DR2 and along the first direction DR1 to rotate based on a rotation axis RX extending in the first direction DR1.

The folding axis FX may be located on a boundary between the wing plate 150 and the first flat plate frame 110, and the rotation axis RX may cross one end of the wing plate 150 in the second direction DR2. A description of the rotational motion of the wing plate 150 in the display device 1 in the second state and the relaxation of the bending stress of the display member 200 occurring therefrom will be described later.

The display member 200 may be located on the jig 100 as illustrated in FIG. 3. The display member 200 may include a bendable bending area BA and a non-bending area that is not bent.

The bending area BA, which is a portion corresponds to the bending display area BDA of the display device 1 according to one or more embodiments, may be generally positioned at the center of the display member 200, but is not limited thereto. The bending area BA may overlap the wing plate 150 of the jig 100, a portion of the second flat plate frame 130, and a portion of the first flat plate frame 110.

The non-bending area, which is the remaining portion of the display member 200 excluding the bending area BA, may be located on both sides of the bending area BA in the second direction DR2, and may correspond to the first display area DA1 and the second display area DA2 of the display device 1 according to one or more embodiments. For example, the non-bending area located on the other side of the bending area BA in the second direction DR2 may correspond to the first display area DA1, and the non-bending area located on one side of the bending area BA in the second direction DR2 may correspond to the second display area DA2. Meanwhile, the bending area BA and the non-bending area of the display member 200 may also be applied to respective components of the display member 200 to be described later.

As illustrated in FIG. 5, the display member 200 may include an upper protective film PL, a window member WC, an adhesive layer ADL, a display panel PNL, a support film PF, a panel lower member CP, and a panel support MP, and an adhesive member ADH may be interposed between the display member 200 and the jig 100 so that the display member 200 and the jig 100 may be attached to each other.

The upper protective film PL of the display member 200 may serve to perform at least one of scattering prevention/reduction, shock absorption, engraving prevention/reduction, fingerprint prevention/reduction, and glare prevention/reduction of the window member WC, which will be described later. The upper protective film PL may be located on a top surface of the window member WC. The upper protective film PL may be attached to the top surface of the window member WC through an adhesive member, such as a pressure-sensitive adhesive.

The window member WC of the display member 200 may serve to protect the display panel PNL, which will be described later, from the outside. The window member WC may be located on/below a bottom surface of the upper protective film PL or on/above a top surface of the display panel PNL. The window member WC is made of a transparent material, and may be, for example, glass or plastic. For example, the window member WC may be an ultra-thin glass or a transparent polyimide film having a thickness of about 0.3 mm or less. Hereinafter, it will be mainly described that the window member WC is a polyimide film.

When the window member WC is the polyimide film, a plastic deformation of the display member 200 may be reduced as compared to when the window member WC is the ultra-thin glass.

The window member WC may be attached to the top surface of the display panel PNL by the adhesive layer ADL. The adhesive layer ADL may be a transparent adhesive film or a transparent adhesive resin.

The display panel PNL is a panel that displays a screen, and any type of display panel, such as an organic light-emitting display panel including an organic light-emitting layer, a micro light-emitting diode display panel using a micro light-emitting diode, a quantum dot light-emitting display panel using a quantum dot light-emitting element including a quantum dot light-emitting layer, or an inorganic light-emitting display panel using an inorganic light-emitting element including an inorganic semiconductor may also be applied as the display panel PNL. Referring to FIGS. 3 and 5, the display panel PNL may display a screen on one side thereof in the third direction DR3.

The display panel PNL may include a substrate having flexibility. In some embodiments, the substrate may include polyimide, but is not limited thereto.

The support film PF of the display member 200 may serve to support the display panel PNL, and to protect the bottom surface of the display panel PNL. The support film PF may be located on the bottom surface of the display panel PNL. In some embodiments, the support film PF may be a plastic, such as polyethylene terephthalate, or polyimide, but is not limited thereto. FIG. 5 illustrates that the support film PF is located in the bending area BA of the display member 200, but the present disclosure is not limited thereto. For example, the support film PF may be removed from the bending area BA of the display member 200, and may be located only in the non-bending area so that the display member 200 is smoothly folded.

The panel lower member CP of the display member 200 may be located on/below a bottom surface of the support film PF. The panel lower member CP may include at least one of a light-blocking layer for absorbing light incident from the outside, a buffer layer for absorbing a shock from the outside, and a heat dissipation layer for efficiently dissipating heat of the display panel PNL.

The light-blocking layer blocks light transmission to reduce or prevent visibility of components located on a lower side of the light-blocking layer, for example, a digitizer, and the like that will be described later, from a front surface of the display panel PNL. The light-blocking layer may include a light-absorbing material, such as a black pigment or a black dye.

The buffer layer absorbs an external shock to reduce or prevent the likelihood of damage to the display panel PNL. The buffer layer may be formed as a single layer or a plurality of layers. For example, the buffer layer may be formed of a polymer resin, such as polyurethane, polycarbonate, polypropylene, or polyethylene, or may include a material having elasticity, such as a sponge formed by foaming rubber, a urethane-based material, or an acrylic-based material.

The heat dissipation layer may include a first heat dissipation layer including graphite or carbon nanotube, and a second heat dissipation layer formed of a thin metal film, such as copper, nickel, ferrite, or silver that may shield electromagnetic waves and that have excellent thermal conductivity.

The panel support MP of the display member 200 may serve to support the bottom surface of the display panel PNL. The panel support MP may be located between the panel lower member CP and the jig 100. The panel support MP may be a rigid member whose shape or volume is not easily changed by external pressure. In some embodiments, the panel support MP may include a metal having rigidity, for example, SUS304, but is not limited thereto. For example, the panel support MP may be carbon fiber reinforced plastics (CFRP) including a plurality of fiber yarns extending in the first direction DR1 or the second direction DR2, and a resin covering the plurality of fiber yarns.

The panel support MP may include a first flat plate portion MP1, a second flat plate portion MP2, and a grid pattern portion LP.

The first flat plate portion MP1 of the panel support MP may be located on the first flat plate frame 110 of the jig 100. The first flat plate portion MP1 may have a flat plate shape parallel to a plane defined in the first direction DR1 and the second direction DR2. The first flat plate portion MP1 may substantially overlap the first display area DA1.

The adhesive member ADH may be interposed between the first flat plate portion MP1 and a portion of the first flat plate frame 110. The first flat plate portion MP1 may include an adhesive portion MP1a attached to the first flat plate frame 110 by the adhesive member ADH, and a free portion MP1b spaced apart from the first flat plate frame 110 in the third direction DR3 because the adhesive member ADH is not interposed therebetween.

Because the adhesive portion MP1a of the first flat plate portion MP1 is attached on the top surface of the first flat plate frame 110 by the adhesive member ADH, the adhesive portion MP1a of the first flat plate portion MP1 may not be bent even when the display device 1 according to one or more embodiments is in the second state. On the other hand, because the adhesive member ADH is not interposed in the free portion MP1b, the free portion MP1b may be spaced apart from the top surface of the first flat plate frame 110, and may be bent when the display device 1 according to one or more embodiments is in the second state. A description thereof will be provided later.

The second flat plate portion MP2 of the panel support MP may be located on the second flat plate frame 130 of the jig 100. The second flat plate portion MP2 may have a flat plate shape parallel to a plane defined in the first direction DR1 and the second direction DR2. The second flat plate portion MP2 may substantially overlap the second display area DA2.

The adhesive member ADH may be interposed between the second flat plate portion MP2 and a portion of the second flat plate frame 130 so that the second flat plate portion MP2 and the second flat plate frame 130 may be attached to each other. Accordingly, the second flat plate frame 130 may not be bent even when the display device 1 according to one or more embodiments is in the second state.

The grid pattern portion LP may allow the panel support MP to be bent. The grid pattern portion LP may include a plurality of slits penetrating through the panel support MP. The grid pattern portion LP may be located between the first flat plate portion MP1 and the second flat plate portion MP2, and may be located on the wing plate 150. In some embodiments, the adhesive member ADH may not be interposed between the grid pattern portion LP and the wing plate 150 to secure bending characteristics of the panel support MP.

The grid pattern portion LP may extend from a portion of the other side of the second flat plate frame 130 in the second direction DR2 to the other side in the second direction DR2 to pass through the rotation axis RX, and may extend to the folding axis FX. Accordingly, when the display device 1 according to one or more embodiments is bent and a plastic deformation occurs in the display member 200, the number of visible lines visually recognized by the user may be reduced. A description thereof will be provided later. Meanwhile, the bending area BA of the display member 200 may be defined by the grid pattern portion LP and the free portion MP1b of the first flat plate portion MP1.

The set member SD may include a first set member SD1, a second set member SD2, and a third set member SD3.

The first set member SD1 may cover the first flat plate frame 110 and a portion of the display member 200 located thereon, the second set member SD2 may cover the second flat plate frame 130 and a portion of the display member 200 located thereon, and the third set member SD3 may cover the hinge portion GP and a portion of the display member 200 located thereon.

The display member 200 exposed to the outside by the set member SD may provide a screen to the user as the display area DA. Because the description of the display area DA is the same as that described above with reference to FIGS. 1 and 2, a detailed description thereof will be omitted.

Meanwhile, a thickness of the second set member SD2 may be greater than a thickness of the first set member SD1. This may be to secure a space in which the wing plate 150 may rotate when the display device 1 according to one or more embodiments is in the second state. A description thereof will be provided later.

Hereinafter, a plastic deformation of the display member 200 that may occur when the display device 1 according to one or more embodiments is in the second state will be described.

Figure 6:
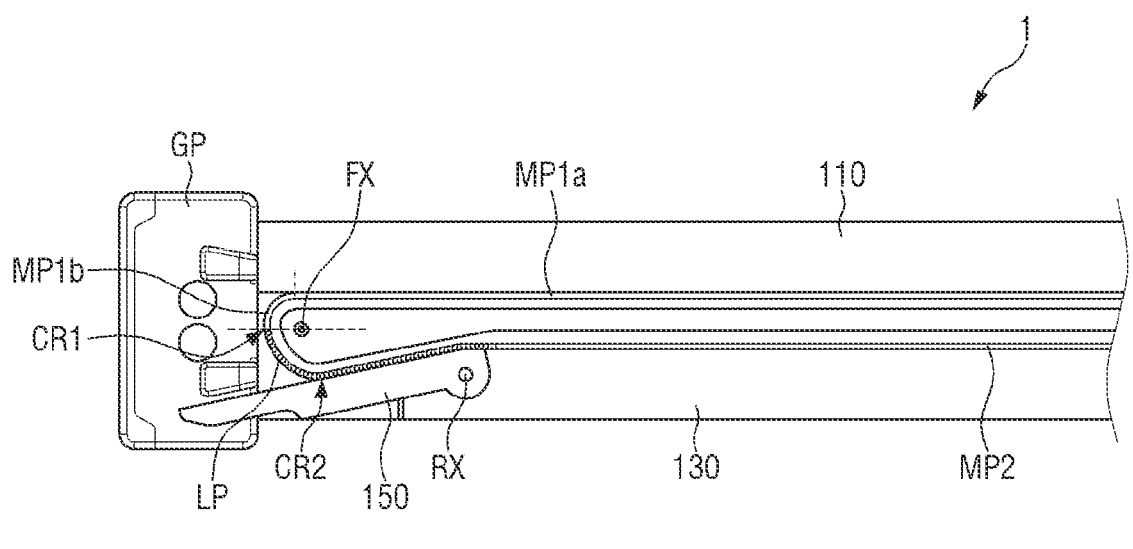
FIG. 6 is a side view illustrating the folded state of the display device according to one or more embodiments.
Figure 7:
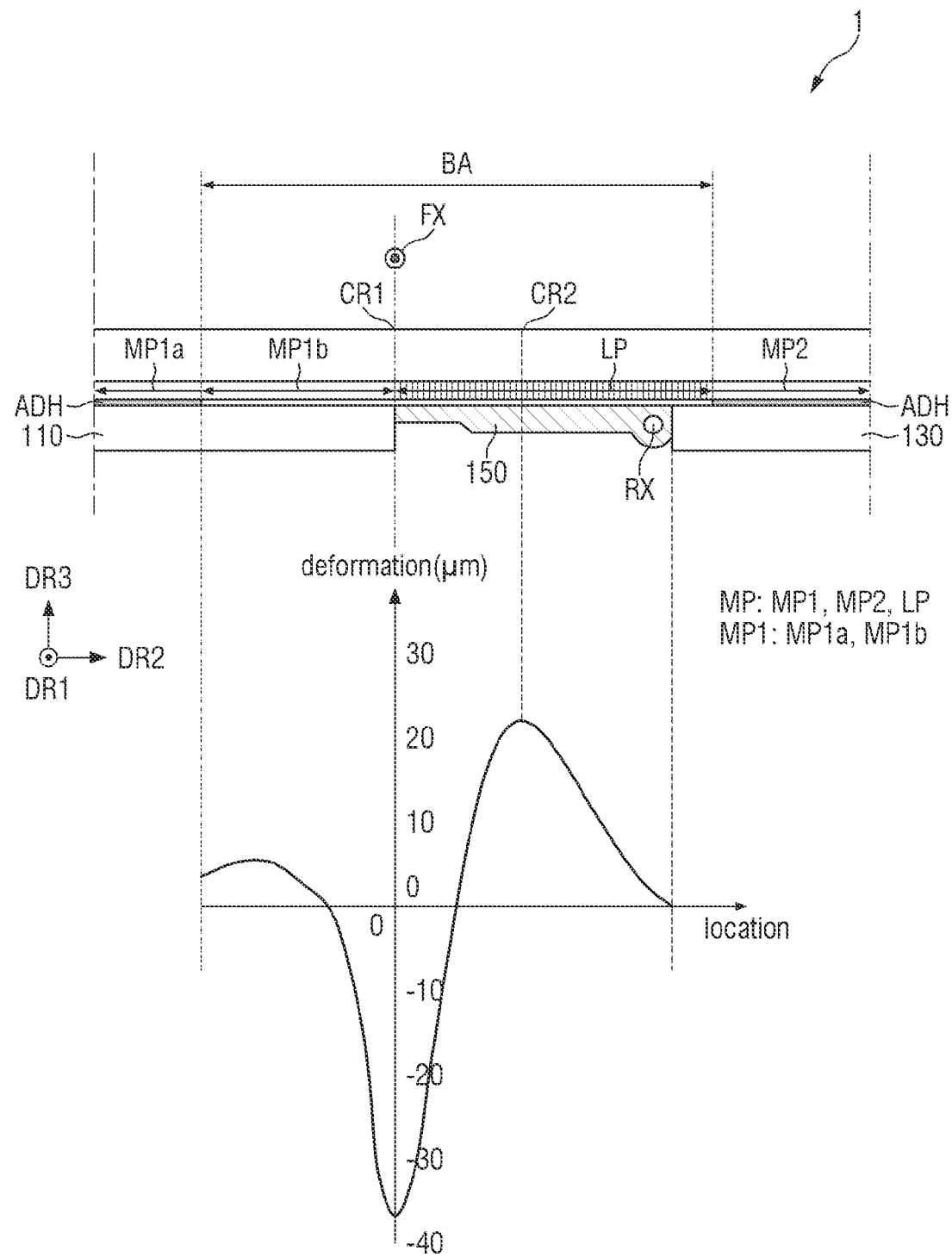
FIG. 7 is a view illustrating a degree of panel deformation of the display device according to one or more embodiments.

FIG. 6 is a side view illustrating the folded state of the display device according to one or more embodiments. FIG. 7 is a view illustrating a degree of panel deformation of the display device according to one or more embodiments.

In FIGS. 6 and 7, only the panel support MP of the display member 200 is illustrated for convenience of explanation, and the components located on the panel support MP are omitted. In addition, a Y-axis of a graph illustrated in FIG. 7 represents a degree to which the display member 200 is deformed in the third direction DR3 due to a plastic deformation of the display member 200, and an X axis represents a location of the display member 200 with respect to the second direction DR2.

Referring to FIG. 6, in the second state of the display device 1 according to one or more embodiments, the wing plate 150 rotates to the outside of the second flat plate frame 130 so that a portion of the display member 200 may be bent to the outside of the display device 1. For example, the second flat plate portion MP2 of the display member 200 may have a profile that is flat in the second direction DR2 on the second flat plate frame 130, and the grid pattern portion LP of the display member 200 may be bent to the outside of the display device 1 at a point passing through the rotation axis RX. The grid pattern portion LP of the display member 200 bent to the outside from the rotation axis RX as a starting point may extend to be flat along the wing plate 150, and may be then bent toward one side in the third direction DR3 to have a radius of curvature (e.g., predetermined radius of curvature), and the free portion MP1b of the display member 200 may be bent toward one side in the second direction DR2 at a point passing through the folding axis FX. The adhesive portion MP1a may have a profile that is flat in the second direction DR2 on the first flat plate frame 110. Accordingly, because the radius of curvature at which the display member 200 is bent is relatively large, the bending stress applied to the display member 200 may be alleviated.

For example, when the display member 200 is bent without the wing plate 150, the display member 200 does not have the portion that is bent to the outside of the display device 1, and therefore, because the display member 200 has a relatively small radius of curvature compared to the case in which the wing plate 150 is provided, the bending stress applied to the display member 200 may increase. As the bending stress applied to the display member 200 increases, it may be difficult to secure reliability of the components of the display member 200. Accordingly, the reliability of the components of the display member 200 may be secured by alleviating the bending stress applied to the display member 200 through the wing plate 150.

Meanwhile, when the display member 200 is bent to the outside of the display device 1, the plastic deformation may occur in the display member 200 itself. When the plastic deformation occurs in the display member 200, a visible line visually recognized by the user due to a deformation of a surface of the display member 200 may be formed in the bending area BA of the display member 200. Therefore, it may be suitable to alleviate the plastic deformation of the display member 200.

As the display device 1 according to one or more embodiments includes only one wing plate 150, the plastic deformation of the display member 200 that occurs as the display member 200 is bent may be alleviated. For example, when the wing plate 150 is additionally located on the first flat plate frame 110 as well as the second flat plate frame 130, the portion bent to the outside of the display device 1 is added, and therefore, the plastic deformation of the display member 200 that occurs as the display member 200 is bent may be intensified. When the plastic deformation of the display member 200 is intensified, the visible line formed by the plastic deformation of the display member 200 in the bending display area BDA in the first state of the display device 1 may increase. Accordingly, the display device 1 according to one or more embodiments may alleviate the plastic deformation of the display member 200 by including only one wing plate 150.

Referring to FIG. 7 together with FIG. 6, the display member 200 of the display device 1 according to one or more embodiments may include a first visible line CR1 and a second visible line CR2 formed by the plastic deformation. The first visible line CR1 and the second visible line CR2 may correspond to portions where inflection points are formed in the graph representing the deformation of the display member 200. For example, the first visible line CR1 may be formed at a portion where the display member 200 is bent to one side in the second direction DR2 from the folding axis FX as a starting point, and the second visible line CR2 may be formed at a portion where the display member 200 is bent to one side in the third direction DR3 on the wing plate 150.

The first visible line CR1 may be formed at a portion where the display member 200 is bent to one side in the second direction DR2 from the folding axis FX as a starting point, that is, at a boundary between the grid pattern portion LP and the free portion MP1b. In other words, the first visible line CR1 may overlap the folding axis FX.

The free portion MP1b may be bent to some extent when the display device 1 is in the second state, but has lower bending characteristics than the grid pattern portion LP, and therefore, the plastic deformation may be concentrated on the boundary between the free portion MP1b and the grid pattern portion LP, that is, a portion overlapping the folding axis FX. Accordingly, the first visible line CR1 visually recognized to the outside according to the plastic deformation of the display member 200 may be formed at the boundary between the free portion MP1b and the grid pattern portion LP. For example, at a location where the first visible line CR1 is formed, the display member 200 may be depressed by about 37.06 µm in the other side in the third direction DR3.

The second visible line CR2 may be formed at a portion where the grid pattern portion LP of the display member 200 starts to be bent in one side in the third direction DR3 on the wing plate 150. The second visible line CR2 may be located between the folding axis FX and the rotation axis RX. The display member 200 may have a relatively large deformation at the portion where the grid pattern portion LP is bent to one side in the third direction DR3. Accordingly, the second visible line CR2 that is visually recognized to the outside according to the plastic deformation of the display member 200 at the portion where the grid pattern portion LP is bent to one side in the third direction DR3 may be formed. For example, at a location where the second visible line CR2 is formed, the display member 200 may protrude by about 21.80 µm in one side in the third direction DR3.

Meanwhile, when a separate wing plate 150 is additionally located on the first flat plate frame 110, a visible line similar to the above-described second visible line CR2 may be additionally formed. In the case in which the visible line is added, because a surface quality of the display member 200 is not secured, the separate wing plate 150 may not be located on the first flat plate frame 110.

In addition, as the separate wing plate 150 is not additionally located on the first flat plate frame 110, a plastic deformation region of the display member 200 may be reduced.

Hereinafter, other embodiments of the display device 1 will be described. In the following embodiments, the same components as those of the above-described embodiments will be denoted by the same reference numerals, and an overlapping description thereof will be omitted or simplified, and differences will be mainly described.

Figure 8:
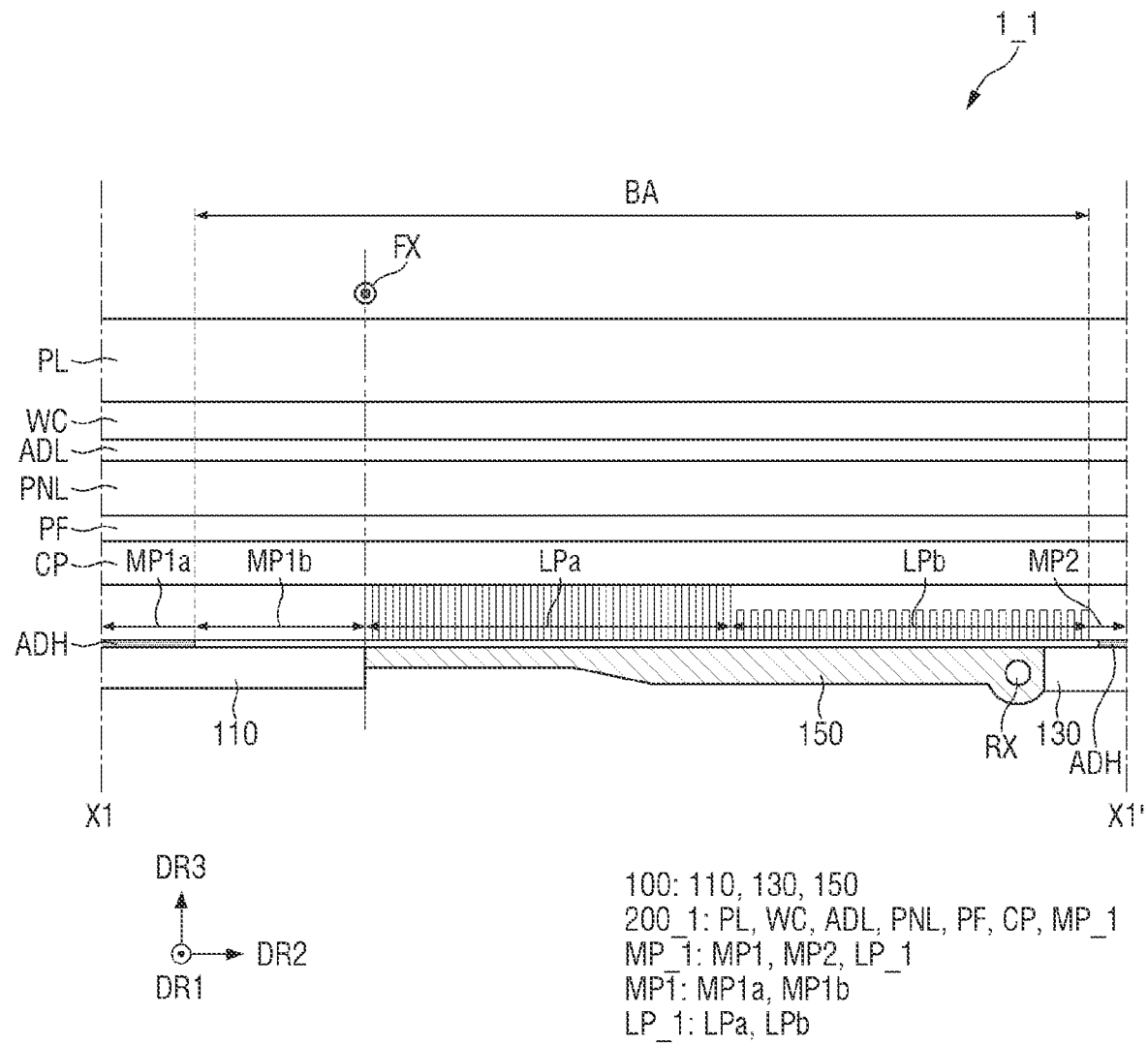
FIG. 8 is a side view illustrating a stacked structure of a display device according to one or more other embodiments.

FIG. 8 is a side view illustrating a stacked structure of a display device according to one or more other embodiments.

Referring to FIG. 8, it is illustrated that a display device 1_1 may include a grid pattern portion LP_1 in which different slit patterns are formed. For example, a portion of the grid pattern portion LP_1 may be completely etched, and the other portion thereof may be half-etched.

A support plate MP_1 of a display member 200_1 may include a grid pattern portion LP_1 in which a first grid pattern LPa and a second grid pattern LPb having different slit patterns are formed.

The first grid pattern LPa may include a first slit penetrating through the support plate MP_1, and the second grid pattern LPb may include a second slit that is partially recessed without penetrating through the support plate MP_1. The first grid pattern LPa may be adjacent to the first flat plate portion MP1, and the second grid pattern LPb may be adjacent to the second flat plate portion MP2. The first grid pattern LPa and the second grid pattern LPb may be continuously formed.

Because the support plate MP_1 has no slit formed in a top surface thereof in the portion where the second grid pattern LPb is formed by the configuration as described above, adhesion to the panel lower member CP located on the support plate MP_1 may be improved.

Figure 9:
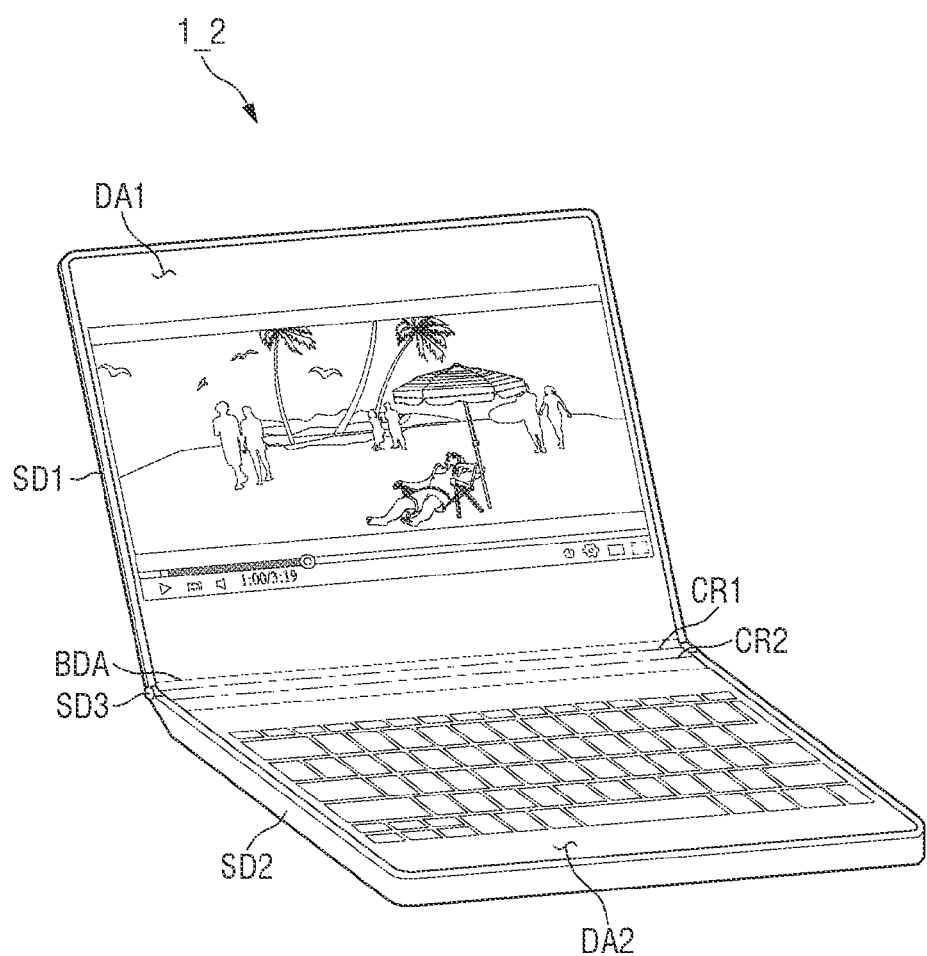
FIG. 9 is a perspective view illustrating a display device according to still one or more other embodiments.

FIG. 9 is a perspective view illustrating a display device according to still one or more other embodiments.

Referring to FIG. 9, it is illustrated that in a display device 1_2, a touch input button may be displayed on the second display area DA2 surrounded by the second set member SD2, and a screen controlled by the touch input button may be displayed on the first display area DA1 surrounded by the first set member SD1. The display device 1_2 according to one or more embodiments is different from the display device 1 according to one or more previous embodiments in that image content displayed on the first display area DA1 and the second display area DA2 is different from that of the display device 1 of one or more previously described embodiments, and other configurations are substantially the same as or similar to each other, therefore, a repeated detailed description of the configuration of the display device 1_2 will be omitted.

As described above with reference to FIGS. 6 and 7, because the first visible line CR1 overlaps the folding axis FX and the second visible line CR2 is located between the folding axis FX and the rotation axis RX, the second visible line CR2 may be located adjacent to the second display area DA2.

Even if the visible line is formed on the screen on which the touch input button is displayed, the user may control the touch input button without any particular interference, but when the visible line is formed on the screen controlled by the touch input button, the visible line may be exposed to the user, thereby obstructing the user's view of the screen. Therefore, by displaying the touch input button on the second display area DA2 adjacent to the second visible line CR2, a more improved display quality may be provided to the user.

Figure 10:
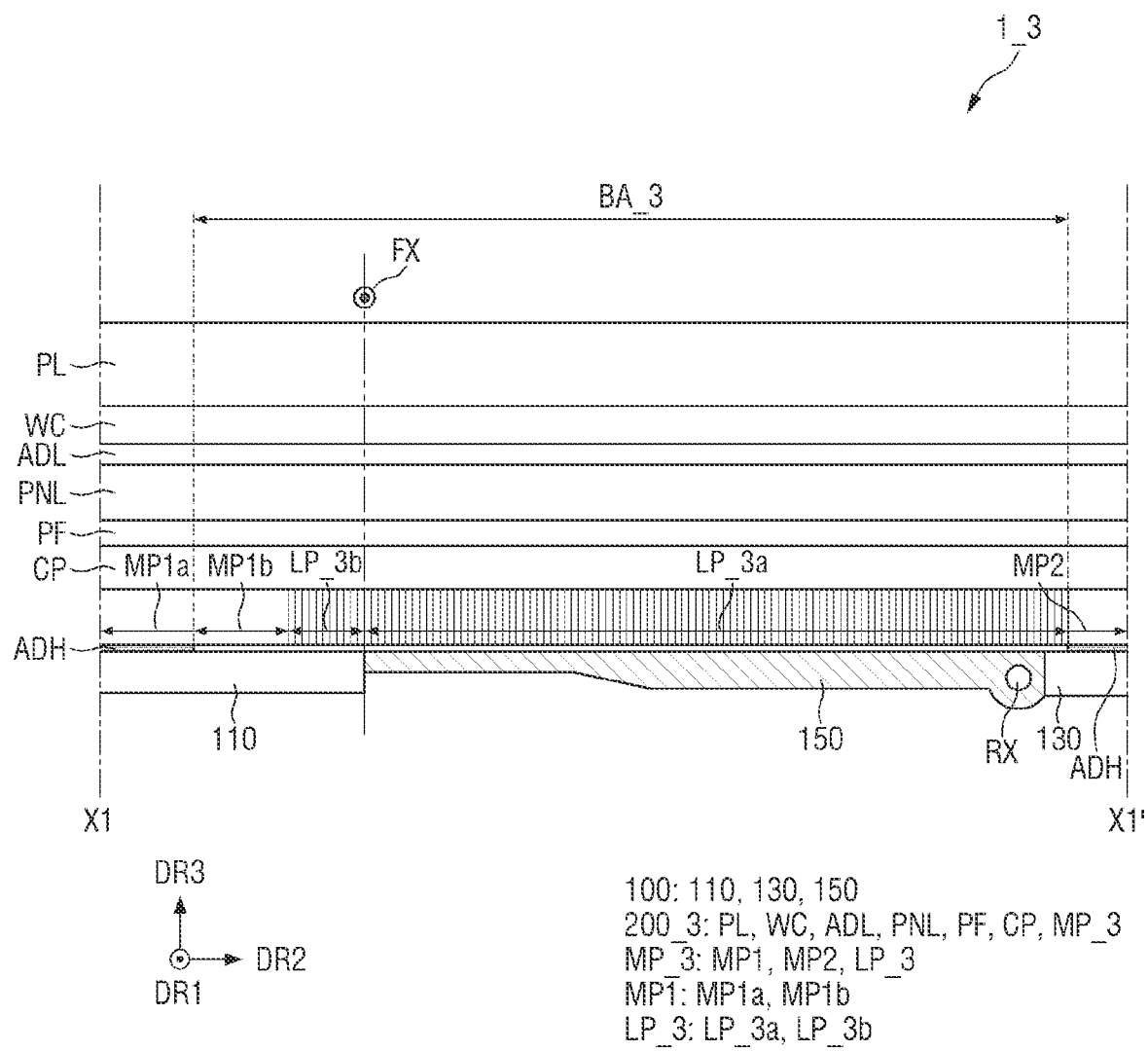
FIG. 10 is a side view illustrating a stacked structure of a display device according to still one or more other embodiments.
Figure 11:
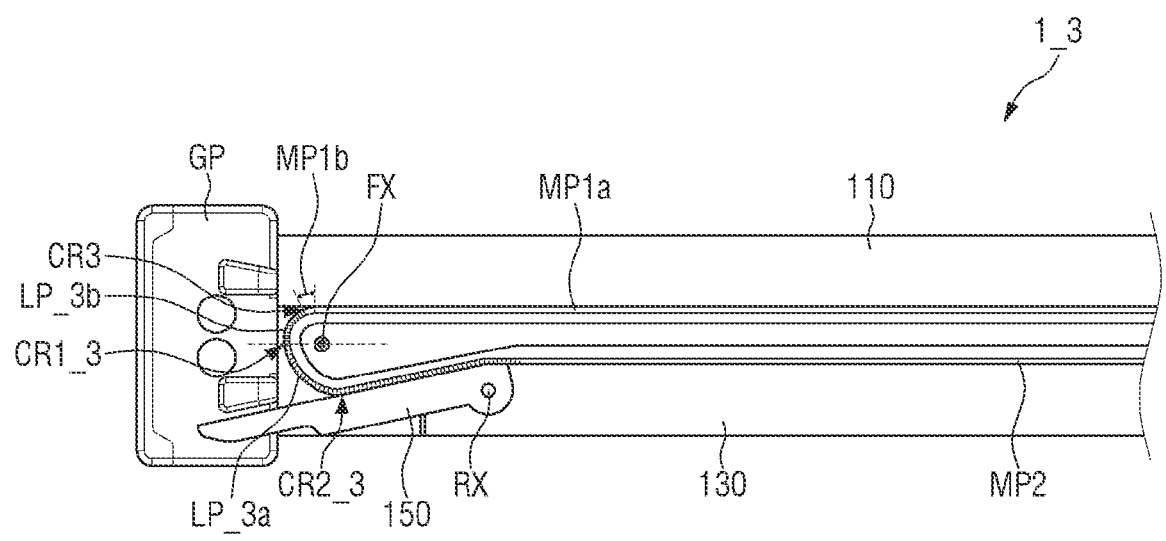
FIG. 11 is a side view illustrating a folded state of the display device according to the one or more embodiments corresponding to FIG. 10.
Figure 12:
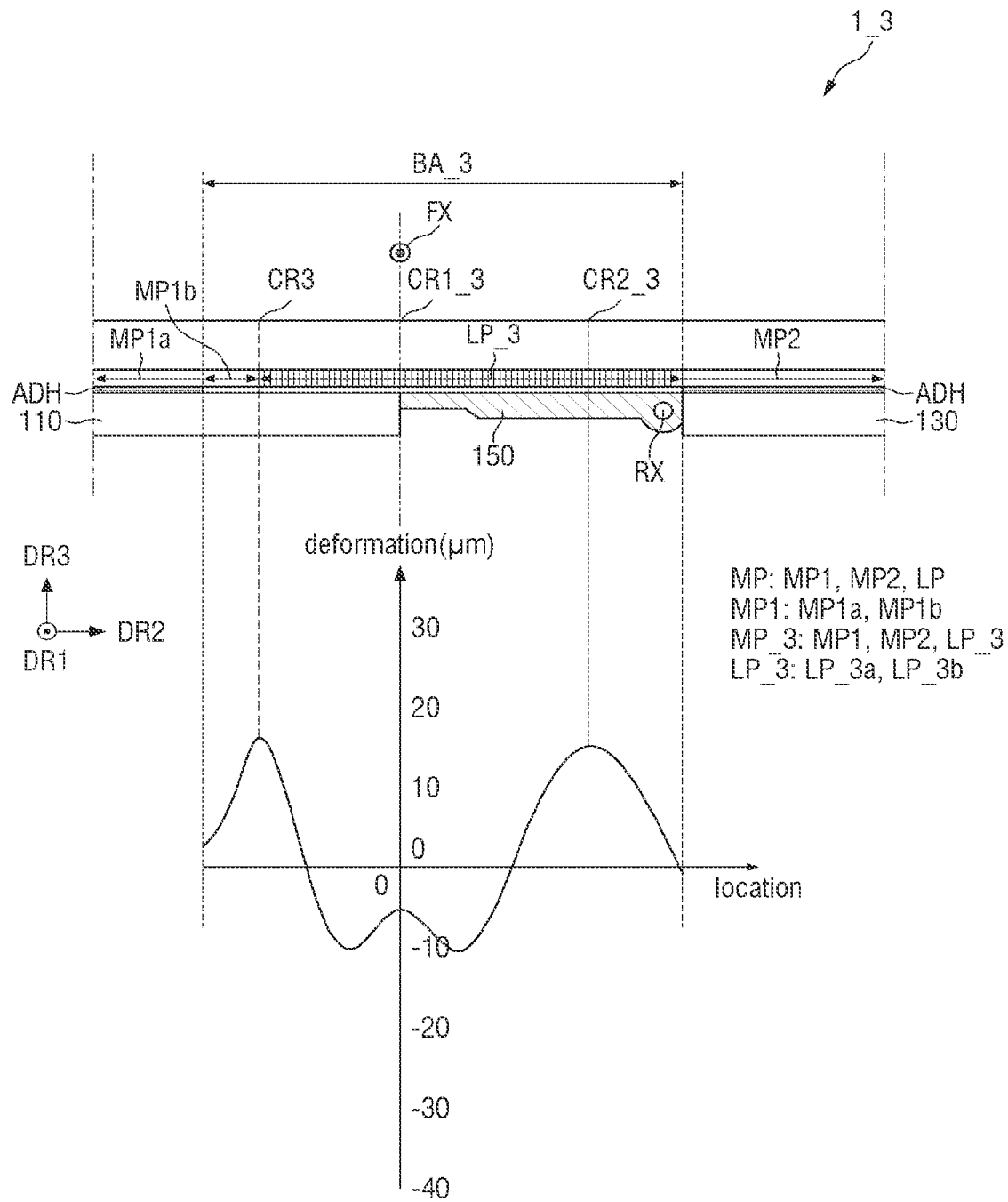
FIG. 12 is a view illustrating a degree of panel deformation of the display device according to the one or more embodiments corresponding to FIG. 10.

FIG. 10 is a side view illustrating a stacked structure of a display device according to still one or more other embodiments. FIG. 11 is a side view illustrating a folded state of the display device according to the one or more embodiments corresponding to FIG. 10. FIG. 12 is a view illustrating a degree of panel deformation of the display device according to the one or more embodiments corresponding to FIG. 10.

Referring to FIGS. 10 to 12, it is illustrated that, in a display device 1_3, a grid pattern portion LP_3 may extend to a portion of the first flat plate frame 110 beyond the folding axis FX.

The grid pattern portion LP_3 of a support plate MP_3 of a display member 200_3 may include a slit penetrating through the support plate MP_3, and may include a first portion LP_3a overlapping the wing plate 150 and a second portion LP_3b overlapping the first flat plate frame 110.

As illustrated in FIG. 11, when the display device 1_3 is in the second state, the first portion LP_3a of the grid pattern portion LP_3 is bent to the outside of the display device 1_3 at a point passing through the rotation axis RX, extends to be flat along the wing plate 150, and is then bent toward one side in the third direction DR3 to have a radius of curvature (e.g., predetermined radius of curvature) in a similar manner as the grid pattern portion LP of the display device 1 of one or more previously described embodiments, and the second portion LP_3b of the grid pattern portion LP_3 is bent to one side in the second direction DR2 based on the folding axis FX. As a result, compared to the display device 1 in which the free portion MP1b is bent to one side in the second direction DR2, a bending stress applied to a portion overlapping the folding axis FX may be reduced.

In addition, because a length of the free portion MP1b is shorter in the display device 1_3 as compared to the display device 1 of one or more previous embodiments, a bending stress applied to a boundary between the second portion LP_3b and the free portion MP1b of the grid pattern portion LP_3 may also be reduced. Accordingly, the display device 1_3 may reduce plastic deformation of the display member 200_3.

Referring to FIG. 12 together with FIG. 11, the display member 200_3 of the display device 1_3 may include a first visible line CR1_3, a second visible line CR2_3, and a third visible line CR3 formed by the plastic deformation. The first visible line CR1_3, the second visible line CR2_3, and the third visible line CR3 may correspond to portions where inflection points are formed in the graph representing the deformation of the display member 200_3. For example, the first visible line CR1_3 may be formed at a portion where the display member 200_3 is bent to one side in the second direction DR2 from the folding axis FX as a starting point, the second visible line CR2_3 may be formed at a portion where the display member 200_3 is bent to one side in the third direction DR3 on the wing plate 150, and the third visible line CR3 may be formed at a boundary portion between the second portion LP_3b of the grid pattern portion LP_3 and the free portion MP1b.

The first visible line CR1_3 may be formed at a portion where the display member 200_3 is bent to one side in the second direction DR2 from the folding axis FX as a starting point, that is, at a boundary between the first portion LP_3a and the second portion LP_3b of the grid pattern portion LP_3. In other words, the first visible line CR1_3 may overlap the folding axis FX.

Because the second portion LP_3b has better bending characteristics than the free portion MP1b, the plastic deformation occurring at the portion overlapping with the folding axis FX may be reduced as compared to the display device 1 of one or more previously described embodiments. For example, at a location where the first visible line CR1_3 is formed, the display member 200_3 may be depressed by about 5.06 μm in the other side in the third direction DR3.

The second visible line CR2_3 may be formed at a portion where the first portion LP_3a of the grid pattern portion LP_3 of the display member 200_3 starts to be bent in one side in the third direction DR3 on the wing plate 150. The second visible line CR2_3 may be located between the folding axis FX and the rotation axis RX. The display member 200_3 may have a relatively large deformation at the portion in which the first portion LP_3a of the grid pattern portion LP_3 is bent to one side in the third direction DR3. Accordingly, the second visible line CR2_3 that may be visually recognized according to the plastic deformation of the display member 200_3 at the portion where the first portion LP_3a of the grid pattern portion LP_3 is bent to one side in the third direction DR3 may be formed.

Compared to the display device 1 of one or more previously described embodiments, in the display device 1_3, the grid pattern portion LP_3 further includes the second portion LP_3b, and as a result, the bending stress is dispersed, so that the plastic deformation that may act on the portion where the first portion LP_3a of the grid pattern portion LP_3 of the display member 200_3 is bent to one side in the third direction DR3 may be reduced. For example, at a location where the second visible line CR2_3 is formed, the display member 200_3 may protrude by about 14.97 μm in one side in the third direction DR3.

The third visible line CR3 may be formed at a boundary between the second portion LP_3b of the grid pattern portion LP_3 and the free portion MP1b. Because the free portion MP1b may be bent to some extent when the display device 1_3 is in the second state, yet has lower bending characteristics than the grid pattern portion LP_3, the plastic deformation may be concentrated on a boundary between the second portion LP_3b of the grid pattern portion LP_3 and the free portion MP1b to form the third visible line CR3. For example, at a location where the third visible line CR3 is formed, the display member 200_3 may protrude by about 14.97 μm in one side in the third direction DR3.

In concluding the detailed description, those skilled in the art will appreciate that many variations and modifications can be made to the embodiments without substantially departing from the present disclosure. Therefore, the disclosed embodiments are used in a generic and descriptive sense only and not for purposes of limitation.

What is claimed is:

1. A display device comprising:
   a display panel configured to be folded with respect to a folding axis extending in a first direction;
   a panel support supporting a bottom surface of the display panel; and
   a jig under the panel support, and comprising:
      a first flat plate frame;
      a second flat plate frame on one side of the first flat plate frame; and
      a wing plate fixed to the second flat plate frame, and configured to rotate with respect to a rotation axis extending in the first direction,
   wherein the folding axis is on a boundary between the first flat plate frame and the wing plate, and
   wherein the panel support comprises:
      a first flat plate portion overlapping the first flat plate frame;
      a second flat plate portion overlapping the second flat plate frame; and
      a grid pattern portion on the wing plate, between the first flat plate portion and the second flat plate portion, and extending to the boundary between the first flat plate frame and the wing plate.

2. The display device of claim 1, wherein the wing plate and the grid pattern portion are spaced apart from each other.

3. The display device of claim 2, wherein the grid pattern portion defines a first slit penetrating through the panel support.

4. The display device of claim 3, wherein the grid pattern portion comprises:
   a first grid pattern portion defining the first slit; and
   a second grid pattern portion defining a second slit partially recessed into the panel support, the second grid pattern portion being closer to the rotation axis than the first grid pattern portion.

5. The display device of claim 1, wherein the jig comprises a hinge portion connecting the first flat plate frame and the second flat plate frame to enable folding of the first flat plate frame and the second flat plate frame with respect to the folding axis.

6. The display device of claim 5, wherein the first flat plate portion comprises:
   an adhesive portion adhered to the first flat plate frame through an adhesive member; and
   a free portion that is not adhered to the first flat plate frame.

7. The display device of claim 6, wherein, when the first flat plate frame and the second flat plate frame are folded by the hinge portion, the free portion of the first flat plate portion is bent.

8. The display device of claim 7, wherein, when the first flat plate frame and the second flat plate frame are folded by the hinge portion, the adhesive portion of the first flat plate portion has a flat profile.

9. The display device of claim 8, wherein the display panel comprises a bending area overlapping the grid pattern portion and the free portion of the first flat plate portion,
   wherein a first visible line and a second visible line, which extend in the first direction in a state in which the jig is unfolded, are formed in the bending area,
   wherein the first visible line is on the boundary between the first flat plate frame and the wing plate, and
   wherein the second visible line is on the wing plate.

10. The display device of claim 1, further comprising:
    a first set cover accommodating the first flat plate frame; and
    a second set cover accommodating the second flat plate frame,
    wherein a thickness of the first set cover is less than a thickness of the second set cover.

11. A display device comprising:
    a display panel folded with respect to a folding axis extending in a first direction;
    a panel support supporting a bottom surface of the display panel; and
    a jig under the panel support, and comprising:
       a first flat plate frame;
       a second flat plate frame on one side of the first flat plate frame; and
       a wing plate fixed to the second flat plate frame, and configured to rotate with respect to a rotation axis extending in the first direction,
    wherein the folding axis is on a boundary between the first flat plate frame and the wing plate, and
    wherein the panel support comprises:
       a first flat plate portion overlapping the first flat plate frame;
       a second flat plate portion overlapping the second flat plate frame; and
       a grid pattern portion between the first flat plate portion and the second flat plate portion, the grid pattern portion being on the wing plate, and extending to a portion of the first flat plate frame beyond the boundary between the first flat plate frame and the wing plate.

12. The display device of claim 11, wherein the wing plate and the grid pattern portion are spaced apart from each other.

13. The display device of claim 12, wherein the grid pattern portion defines a first slit penetrating through the panel support.

14. The display device of claim 11, wherein the jig comprises a hinge portion connecting the first flat plate frame and the second flat plate frame to each other with a hinge to enable the first flat plate frame and the second flat plate frame to fold with respect to the folding axis.

15. The display device of claim 14, wherein the first flat plate portion comprises:
    an adhesive portion adhered to the first flat plate frame through an adhesive member; and
    a free portion that is not adhered to the first flat plate frame.

16. The display device of claim 15, wherein, when the first flat plate frame and the second flat plate frame are folded by the hinge portion, the grid pattern portion is bent at a portion overlapping the rotation axis, and a portion overlapping the folding axis.

17. The display device of claim 16, wherein the display panel comprises a bending area overlapping the grid pattern portion and the free portion of the first flat plate portion, wherein a first visible line, a second visible line, and a third visible line extending in the first direction in a state in which the jig is unfolded are formed in the bending area, wherein the first visible line is on the boundary between the first flat plate frame and the wing plate, wherein the second visible line is on the wing plate, and wherein the third visible line is on the first flat plate frame.

18. A display device comprising:

a display panel configured to fold with respect to a folding axis extending in a first direction;

a jig under the display panel to guide a folding behavior of the display panel; and a set member accommodating the jig, wherein the jig comprises:

a first flat plate frame;

a second flat plate frame on one side of the first flat plate frame;

a hinge portion connecting the first flat plate frame and the second flat plate frame with a hinge to enable the first flat plate frame and the second flat plate frame to fold with respect to the folding axis; and a wing plate fixed to the second flat plate frame, and configured to rotate with respect to a rotation axis extending in the first direction, wherein the folding axis is on a boundary between the first flat plate frame and the wing plate, wherein the set member comprises:

a first set cover accommodating the first flat plate frame; and a second set cover accommodating the second flat plate frame and the wing plate, and wherein a thickness of the first set cover is less than a thickness of the second set cover.

19. The display device of claim 18, wherein the display panel comprises:

a first display area overlapping the first flat plate frame;

a second display area overlapping the second flat plate frame;

a bending display area between the first display area and the second display area; and a first visible line extending in the first direction on the boundary between the first flat plate frame and the wing plate, and a second visible line extending in the first direction adjacent to the second display area, in the bending display area.

20. The display device of claim 19, further comprising a touch input button on the second display area.

* * * * *